United States Patent [19]
Seu

[11] 3,760,979
[45] Sept. 25, 1973

[54] MACHINE FOR MOLDING BATTER
[76] Inventor: Lindow Seu, 1144 Coronado Ter., Los Angeles, Calif. 90026
[22] Filed: Mar. 30, 1972
[21] Appl. No.: 239,591

[52] U.S. Cl.................................. 222/330, 99/92
[51] Int. Cl............................................ A21d 13/08
[58] Field of Search.................. 222/276, 330, 485, 222/486; 99/90, 92

[56] References Cited
UNITED STATES PATENTS
| | | | |
|---|---|---|---|
| 506,981 | 10/1893 | Demerath | 222/330 |
| 2,893,078 | 7/1959 | Jahn | 222/486 X |
| 2,120,297 | 6/1938 | Reinecke | 222/189 X |
| 2,115,799 | 5/1938 | Brandt | 222/330 |

Primary Examiner—Robert B. Reeves
Assistant Examiner—Thomas E. Kocovsky
Attorney—Harold L. Jackson et al.

[57] ABSTRACT

A machine for dispensing multiple uniformly molded portions of batter formed to have a circular shape with a central depression, is disclosed. A forcing unit is hydraulically driven downward against a feed member to have batter applied to a baking sheet in the desired form. The forcing unit includes a plurality of operatively ganged piston-cylinder components which serve to force measured portions of batter through a funnel element supported on a measuring plate of the feed member. An elevating pedestal serves to situate the baking sheet in close proximity beneath the feed member to receive the batter that is driven through the respective funnels by the forcing unit.

11 Claims, 8 Drawing Figures

PATENTED SEP 25 1973 3,760,979

MACHINE FOR MOLDING BATTER

BACKGROUND OF THE INVENTION

1. Field of the Invention

This invention generally relates to machines for dispensing batter. More specifically, the present invention concerns a machine for simultaneously forming and applying multiple uniform portions of batter to a baking sheet to form cookies having a circular shape with a central depression.

2. Description of the Prior Art

Many batter dispensing devices are available in the prior art. Such devices have long been used to mechanically dispense batter or other viscous substances. For example, such prior art devices have been used in the baking of cookies as well as the preparation of doughnuts and other bakery products.

A common mechanical arrangement for a prior art dispensing device involves a cylinder in which batter is contained. A manually operated plunger is situated within, and at one end of, the cylinder to be urged towards the other end thereof to displace batter contained in the cylinder. A die or template may be used to lend a desired fanciful shape, such as the silhoutte of an animal or a geometric design, to the dispensed portions of batter. In many cases, the template is removable, or movable, to permit templates for different designs to be used with the dispenser.

Despite the availability of such prior art devices, there still remains a lack of dispensers for automatically placing onto a baking sheet multiple identical portions of batter having a circular shape and a centrally located depression, as is characteristic of the familiar almond cookies.

Such almond cookies, for example, are known to be commonly prepared by having the batter manually rolled into balls and placed on a baking sheet. The balls are then flattened and provided with a central depression by hand. Uniformity in the volume of each portion is primarily achieved, if at all, by human approximation. Clearly, significant numbers of man-hours are required to prepare such almond cookies in the described manner.

It is accordingly the intention of the present invention to provide a device by which a plurality of identical portions of batter having a circular shape with a central depression can be quickly and efficiently applied to a baking sheet with a minimum of human labor such that substantial reductions in labor force, time of preparation, and expense can be provided in the preparation of certain cookies.

SUMMARY OF THE INVENTION

Briefly described, the present invention involves a machine for dispensing multiple uniform portions of batter having a circular shape with a central depression.

More particularly, the subject batter dispensing machine includes a feed member including a plurality of funnels extending through, and supported on, a measuring plate. A forcing unit serves to displace measured portions of batter through each of the funnels of the feed member. The forcing unit is movably supported on a pair of horizontal rails to permit lateral movement such that the forcing unit may be superimposed with, or moved away from, the feed member to permit the placement and replacement of batter thereon preparatory to each dispensing of batter. The forcing unit includes a plurality of cylinders maintained beneath a supporting plate. Each cylinder is provided with one of an equal number of pistons which are secured by a piston rod to a drive plate. A hydraulically operated ram, or the like, is connected to initially move the entire forcing unit, and finally the respective pistons, downward against the feed member to force batter through each of the funnels of the feed member. A baking sheet is placed in predetermined proximity to the underside of the feed member, to receive dispensed batter, by a pedestal which is adapted to be elevated or lowered between set positions to facilitate placement and removal of baking sheets.

The objects and many attendant advantages of the invention will be more readily appreciated as the same becomes better understood by reference to the following detailed description which is to be considered in connection with the accompanying drawings wherein like reference symbols designate like parts throughout the figures thereof.

DETAILED DESCRIPTION OF THE PREFERRED EMBODIMENT

Figure 1:
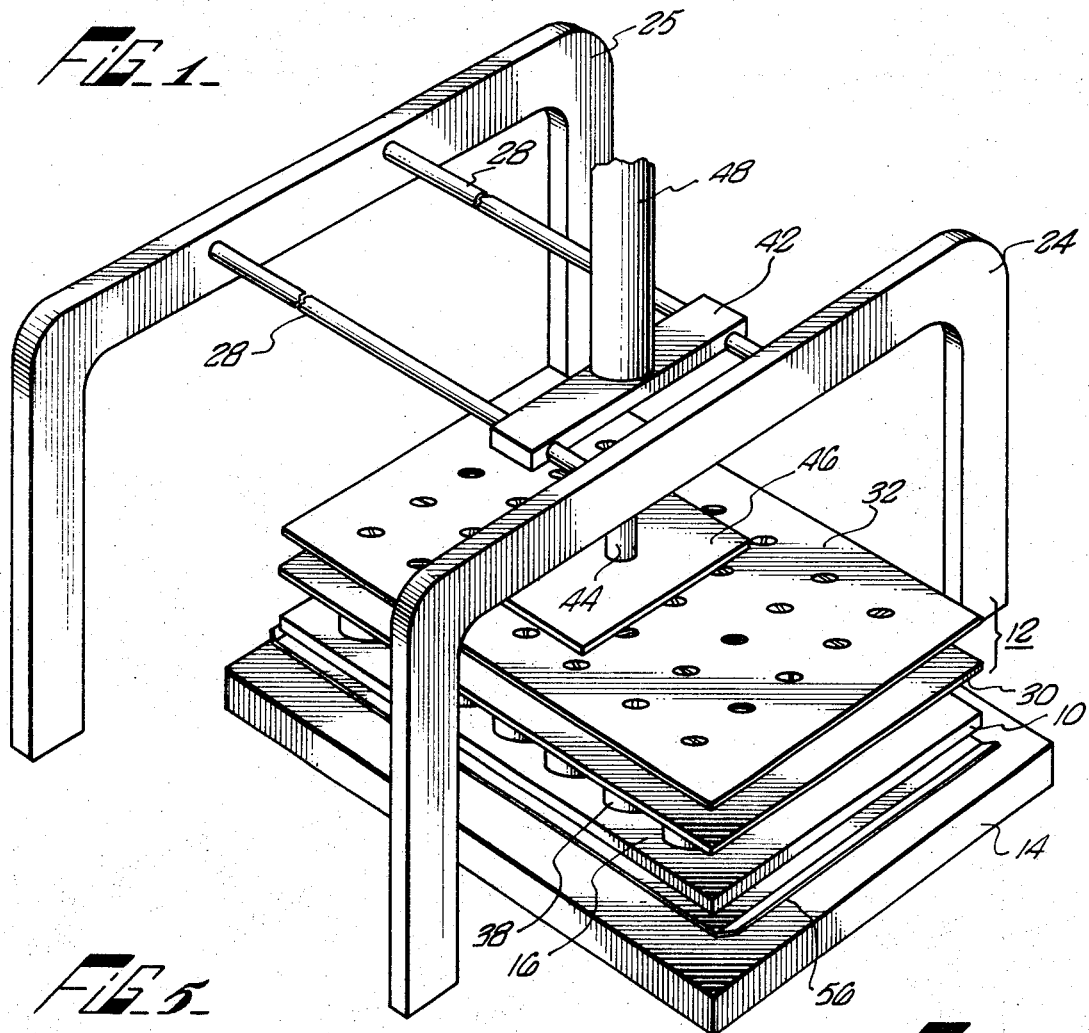
FIG. 1 is a schematic diagram illustrating a perspective view of a machine for dispensing batter in accordance with the present invention.
Figure 2:
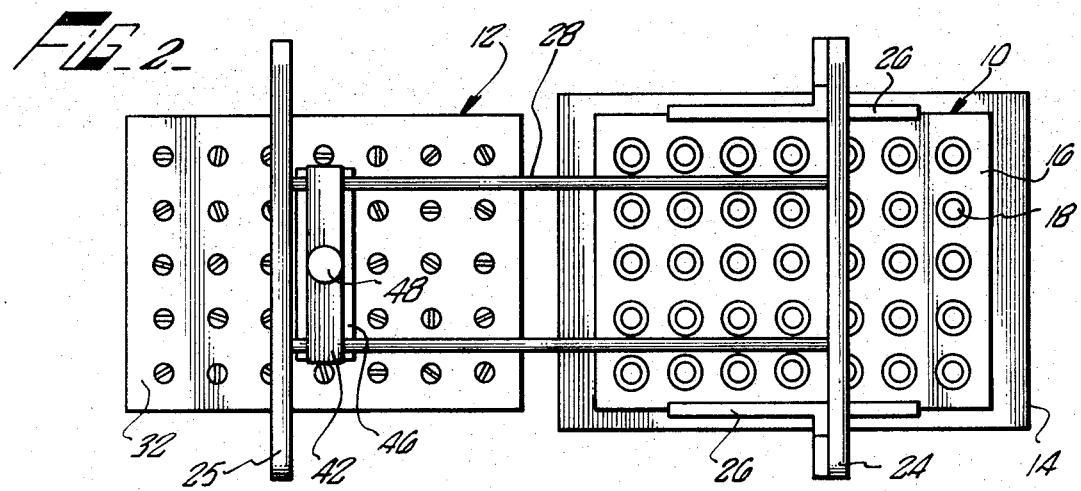
FIG. 2 is a schematic diagram illustrating a top plan view of the machine shown in FIG. 1.
Figure 3:
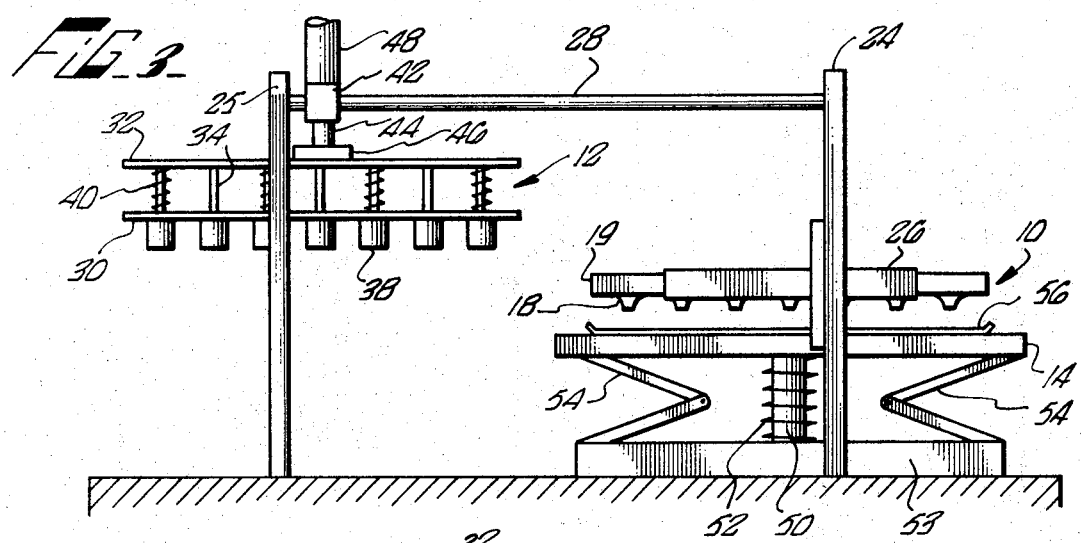
FIG. 3 is a schematic diagram illustrating a side elevation view of the machines shown in FIG. 1.

Referring to FIGS. 1, 2 and 3, a dispensing machine in accordance with the present invention primarily involves a feed member 10, a forcing unit 12 and a raisable pedestal 14.

The feed member 10 includes a flat measuring plate 16 having a plurality of apertures which are sized to each receive a funnel 18. The funnels 18 may be arranged on the measuring plate 16 as a rectangular matrix, as shown, and may be appropriately retained in the respective apertures of the measuring plates 16 such as by the use of a plurality of securing straps, an overlay, or the like.

The measuring plate 16 is provided with a rim 19 that is positioned about the periphery thereof. The rim 19 is of a preselected width or height corresponding to a desired thickness of batter to be positioned on the measuring plate 16 preparatory to the batter being dispensed as is explained in greater detail hereinafter.

Figure 5:
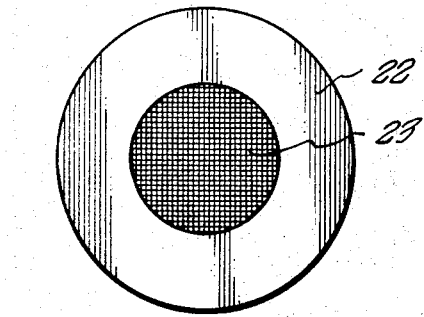
FIG. 5 is a schematic diagram illustrating an exemplary funnel screen that may be used in conjunction with a funnel as shown in FIG. 4.
Figure 4:
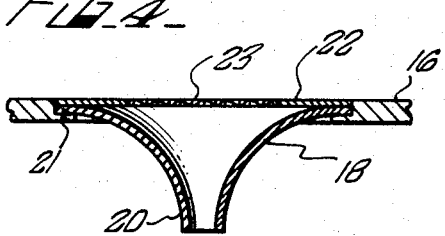
FIG. 4 is a schematic diagram illustrating a partially fragmented, cross-sectional side view of a single funnel included on the feed member which is useable with the present invention.

Referring briefly to FIG. 4, each of the funnels 18 may have a downwardly extending nozzle or oriface 20 and an upper flange portion 21 that is supported on, or by, the measuring plate 16. A screen member 22 is positioned to cover the upper opening of each of the funnels 18. As shown by FIG. 5, each of the screen members 22 may basically include a flat ring in the center of which is retained a screened portion 23 having a suitable gage. As an example, the gate of screen typically used for covering windows and doors of buildings would be suitable.

Referring once again to FIGS. 1, 2 and 3, the feed member 10 is retained in a raised position by being securely supported between the legs of one of a pair of arches 24 and 25. As shown, a pair of brackets 26 may be affixed on the respective legs of the arch 24 in a horizontal plane common to both brackets 26. Each of the brackets 26 may, for example, have a transverse C configuration which would permit a feed member 10 to be laterally slid between the brackets 26 and retained thereby in a fixed vertical position. Where desired, a suitable locking mechanism (not shown) may be provided on each of the brackets 26 to secure the feed member 10.

The arches 24 and 25 serve to support a pair of spaced horizontally oriented rails 28. These rails 28 serve as a support and guide for the forcing unit 12 and function as the means by which the forcing unit 12 may be laterally moved into, and from, vertical superimposed alignment with the feed member 10.

Figure 6:
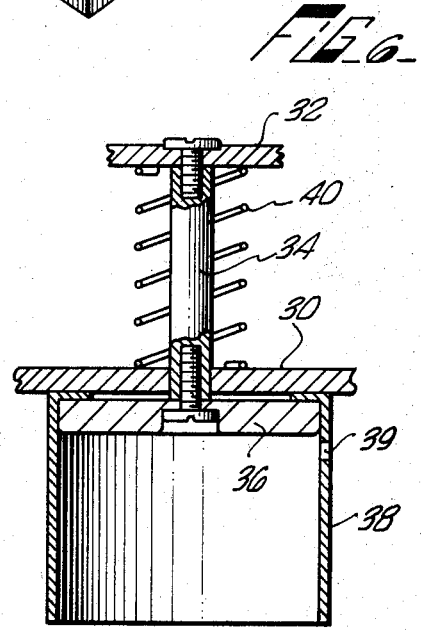
FIG. 6 is a achematic diagram illustrating a partially fragmented, cross-sectional side view of a single cylinder and piston combination which is useable with the present invention.

The forcing unit 12 includes a supporting plate 30 and a drive plate 32. The supporting plate 30 is adapted to have a plurality of apertures in the same arrangement as the apertures on the measuring plate 16. The respective apertures on both of the plates 16 and 30 are placed to have the centers thereof in vertical alignment when the forcing unit 12 and the feed member 10 are in vertical alignment. Each of the apertures of the supporting plate 30 permits passage of a piston rod 34 therethrough. As shown in greater detail by FIG. 6, each piston rod 34 is connected at an upper end to the drive plate 32 and is secured to a piston 36 at the lower end thereof. A cylinder 38 is appropriately secured to the under surface of the supporting plate 30 in a position concentric with the respective apertures of the supporting plate 30 through which the piston rods 34 are extended. A separating spring 40 may be placed about selected ones, or all, of the piston rods 34 and between the supporting plate 30 and the drive plate 32 to urge ambient separation thereof. A vent hole 39 may be provided in the wall of each cylinder 38 in the upper regions thereof to facilitate the cylinders 38 being applied to a layer of batter. Also, the walls of the cylinders 38 are preferably thin for this purpose.

The pistons 36 are accordingly positioned to be driven downwardly for the length of the cylinders 38 by compression or closure of the distance between the supporting plate 30 and the drive plate 32. Closure of the distance between the plates 30 and 32 would require force sufficient to counter the force of the plurality of separating springs 40 which are concentrically situated about the selected number of piston rods 34. Clearly, the number of separating springs 40 that are employed would depend on the relative spring constants of the springs 40, the weight of the plate 32, the viscosity of batter to be processed, etc.

The forcing unit 12 is supported from the rails 28 by means of any suitable suspending mechanism. As illustrated, a simple suspending mechanism may involve a movable support carriage 42 extending across and movably retained on the rails 28. A suspension post 44 may extend through the support carriage 42 and be connected to a securing plate 46 at a lower end of the post 44. The securing plate 46 is attached to the upper surface of the drive plate 32.

In the present instance, the suspension post 44 may be the extensible member of a hydraulic ram 48, the outer housing of which is supported atop the supporting carriage 42. Any conventional hydraulic control system (not shown) may be used to control the ram 48. The suspension post 44 is situated to be vertically extended and retracted to respectively lower and raise the forcing unit 42.

The support carriage 42 may be fashioned in any desired configuration and may be equipped with roller bearings, or the like, to facilitate lateral movement along the rails 28. Similarly, any conventional type of rails may be used to permit easy lateral displacement of the carriage 42.

As illustrated, the arches 24 and 25 should be appropriately spaced to permit the forcing unit 12 to be moved laterally away from the feed member 10 at one extreme (towards the arch 25) and moved into vertical alignment at the other extreme (towards the arch 24).

The pedestal 14 is adapted to be raised and lowered by any suitable means such as, for example, by being supported on a centrally located column 50 having a concentric biasing spring 52 which serves to urge the pedestal 14 upwardly from a pedestal base 53. The undersurface of the pedestal 14 may also be provided with folding support arms 54 which are suitably provided with detents, or the like, such that the pedestal 14 may be retained in a preferred vertical position. The combination of the column 50 and the spring 52 may be used in conjunction with, or as alternatives to, the folding support arms 52.

There are at least two primary positions that are preferred for the pedestal 14. The first would be a collapsed position against the base 52 which would facilitate removal of a baking sheet 56, or the like, which is placed thereon to receive dispensed batter. The second position would be a raised position wherein a baking sheet 56 supported by the pedestal 14 is placed in close proximity to the under side of the feed member 10 to receive batter that is displaced through each of the funnels 18 by interaction of the feed member 10 and the forcing unit 12.

Considering the operation of the subject invention, batter is initially placed on the measuring plate 16 of the feed member 10 such that each of the funnels 18 is occupied by batter. The measuring plate 16 would also be uniformly covered with a layer of batter. It is noted that the thickness of the layer of batter would be a factor in determining the size of each of the portions to be applied to a baking sheet 56. To this end, the rim 19 of the measuring plate 16 may be provided with a width corresponding to a selected thickness for the layer of batter.

Figure 7:
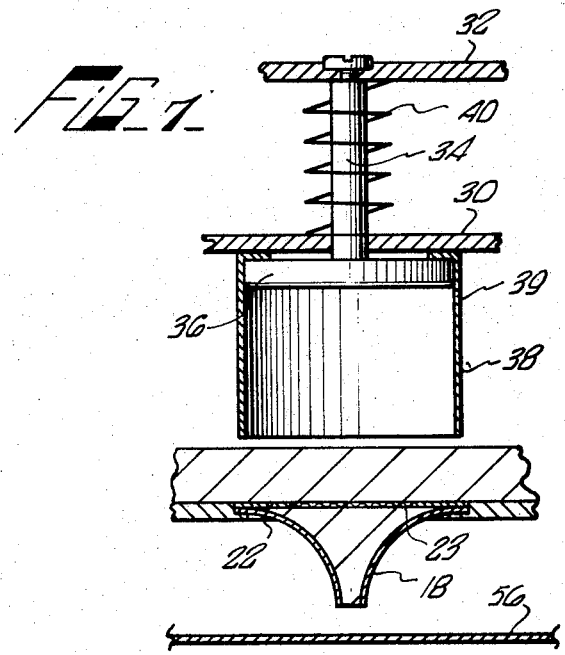
FIG. 7 is a schematic diagram illustraging a partially fragmented, cross-sectional side view of a single cylinder of the forcing unit positioned above a funnel of the feed member preparatory to having batter dispensed onto a baking sheet in accordance with the present invention.

The forcing unit 12 is subsequently moved laterally along the rails 28 from the position shown in FIGS. 2 and 3 to be positioned in vertical alignment with the feed member 10, as shown by FIGS. 1 and 7. A baking sheet 56 would be placed on the pedestal 14 which is then raised to its predetermined raised position. It has been empirically determined that the baking sheet 56 is best maintained approximately one-half inch away from the lower rim of the funnels 18 to perform the intended purpose. It is to be understood that such spacing may be varied to accommodate different sized portions of batter.

Figure 8:
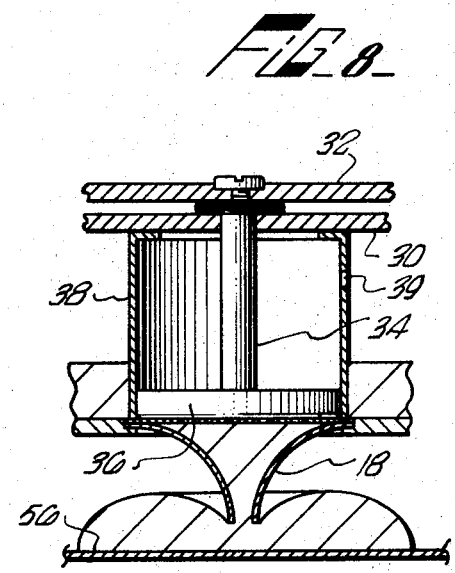
FIG. 8 is a schematic diagram illustrating the apparatus shown in FIG. 7 situated in a final downward position to have batter placed on the baking sheet in accordance with the present invention.

The forcing unit 12 is then lowered by operation of the hydraulic ram 48 to have the lower most rim of each of the cylinders 38 cut through the layer of batter and contact the upper surface of the measuring plate 16. It has been found that uniform contact of the forcing unit 12 with the feeding member 10 is facilitated by having the securing plate 46 loosely connected to the end of the suspension post 44. This may be accomplished, for example, by having the plate 46 loosely bolted to the end of the post 44. Continued operation of the ram 48 and extension of the suspension post 44 causes the driving plate 32 to continue downward to have the pistons 36 contact the layer of batter to force the batter contained by the individual cylinders 38 through the respective funnels 18 that are vertically aligned therewith. FIG. 8 illustrates a single piston of the forcing unit 12 in its final full stroke position against the screen member 22 covering the funnel 18.

The batter driven through each funnel 18 is received by the baking sheet 56. It is believed that due to surface action of the dispensed batter, a circular shape is formed. The lower most rim of the funnel 18 causes the dispensed batter to have the central depression by being maintained in close proximity to the baking sheet 56, as earlier pointed out.

After batter has been dispensed through the feed member 10, the hydraulic ram 48 may be operated to raise the forcing unit 12 to its uppermost position wherein the piston 36 is retracted upwardly to its natural position against the under surface of the supporting plate 30 and the entire forcing unit 12 is raised.

The screen member 22 convering the funnels 18 serve to permit the batter contained therein to remain within each of the funnels 18 such that a reapplication of batter to the feed member 10, to a level determined by using the rim 19 as a guide, does not require the refilling of the funnels 18 subsequent to the first dispensing operation.

The return of the forcing unit 12 to a laterally displaced position facilitates a fresh supply of batter being applied to the feed member 10. The pedestal 14 may be lowered to facilitate removal of the baking sheet 56 on which portions of batter have been applied and to facilitate placement of a fresh baking sheet.

The size of the subject machine may be varied as necessary to perform the desired and intended function.

For example, two feed members 10 and pedestals 14 may be used to have dual operation wherein the forcing unit 12 is alternately used with the pair of feed members 10 that are provided.

From the foregoing detail description it is now apparent that the subject invention provides a machine for dispensing multiple uniformly sized portions of batter in the form of a circle having a central depression. It is also clear that the subject invention substantially contributes to the savings in cost, time, and labor required to prepare a large volume of such batter portions such as would be required in the manufacture of cookies.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

1. A machine for dispensing multiple uniformly molded portions of batter, the machine comprising:
   a feed member on which batter to be dispensed is placed in a layer, said feed member including a plurality of ports each formed by a downwardly extending funnel;
   a forcing unit for forcing batter to be dispensed through said funnels, said forcing unit including a supporting plate, a driving plate, and a plurality of driving means for displacing a predetermined amount of batter through each of said funnels, said driving means including:
      a plurality of cylinders arranged on the underside of said supporting plate to correspond with said plurality of ports,
      a plurality of pistons each situated in one of said cylinders,
      a plurality of piston rods for connecting said pistons to said driving plate, said piston rods extending through said supporting plate, and
      spring means situated between said driving and supporting plates for urging a preselected ambient separation of said driving plate and supporting plate wherein compression of said spring means by closure of the separating distance between said driving and supporting plates operates to move said pistons through said cylinders for the length thereof; and
   pedestal means for positioning apparatus, for receiving dispensed batter, beneath said feed member in predetermined proximity to the lowermost portion of said funnels.

2. The machine defined by claim 1, said feed member including:
   a flat plate having said plurality of ports, said funnels being fastened to said flat plate to extend downwardly therefrom; and
   an upstanding rim situated about the periphery of said flat plate, said rim serving as a guide for determining the thickness of a layer of batter placed on said flat plate.

3. The machine defined by claim 2, said feed member further including screen elements situated on said ports, said screen elements permitting batter to be forced therethrough to be displaced through said funnels and preventing batter from being retracted from said funnel.

4. The machine defined by claim 1, said pedestal means including positioning means for vertically moving said pedestal to and from said predetermined proximity to the lowermost portion of said funnels.

5. The machine defined by claim 1 further including:
   a pair of parallel guide rails;
   rail support means for supporting said guide rails in an elevated horizontal position, said feed member being supported in an elevated position by said rail support means; and carriage means for suspending said forcing unit from said guide rails to allow lateral movement along said guide rails to be placed in vertical alignment with, and above, said feed member.

6. The machine defined by claim 1, said forcing unit further including hydraulic means for moving said driving means downward to contact said feed member wherein the batter contained by each of said cylinders is displaced through said funnels of said feed member.

7. The machine defined by claim 6, said hydraulic means including an extendable member which is connected at a leading end to said driving plate to provide upward and downward movement of said driving means and said driving and supporting plates in response to extension and retraction, respectfully, of said extendable member of said hydraulic ram.

8. The machine defined by claim 7 further including:
a pair of parallel rails;
rail support means for supporting said parallel rails in an elevated horizontal position, said feed member being supported in an elevated position by said rail support means;
carriage means movably mounted on said parallel rails to permit lateral movement along said rails, said forcing unit being supported from said carriage means for being moved into and from vertical alignment above said feed member, said hydraulic ram being mounted on said carriage to have said extendable member thereof adapted to be downwardly extended by operation of said hydraulic ram.

9. The machine defined by claim 8, said feed member including:
a flat plate having said plurality of ports, said funnels being fastened to said flat plate to extend downwardly therefrom; and
an upstanding rim situated about the periphery of said flat plate, said rim serving as a guide for determining the thickness of a layer of batter placed on said flat plate.

10. The machine defined by claim 9, said feed member further including screen elements situated on said ports, said screen elements permitting batter to be forced therethrough to be displaced through said funnels and preventing batter from being retracted from said funnel.

11. The machine defined by claim 10, said pedestal means including positioning means for vertically moving said pedestal to and from said predetermined proximity to the lowermost portion of said funnels.

* * * * *